Feb. 7, 1933. S. SCHWARTZ 1,896,723
METHOD AND MEANS FOR PRODUCING MOTOR FUEL
Filed Dec. 7, 1925 2 Sheets-Sheet 2

Inventor
Stephen Schwartz.
By
Attys.

Patented Feb. 7, 1933

1,896,723

UNITED STATES PATENT OFFICE

STEPHEN SCHWARTZ, OF CALUMET CITY, ILLINOIS, ASSIGNOR TO JENKINS PETROLEUM PROCESS COMPANY, OF CHICAGO, ILLINOIS, A CORPORATION OF WISCONSIN

METHOD AND MEANS FOR PRODUCING MOTOR FUEL

Application filed December 7, 1925. Serial No. 73,643.

My invention relates to the refining and cracking of petroleum, and has particular reference to economy of heat and of decolorizing agents, and to obtaining a defined distillation range having a sharp end point for certain of the distillates obtained.

Figure 1:
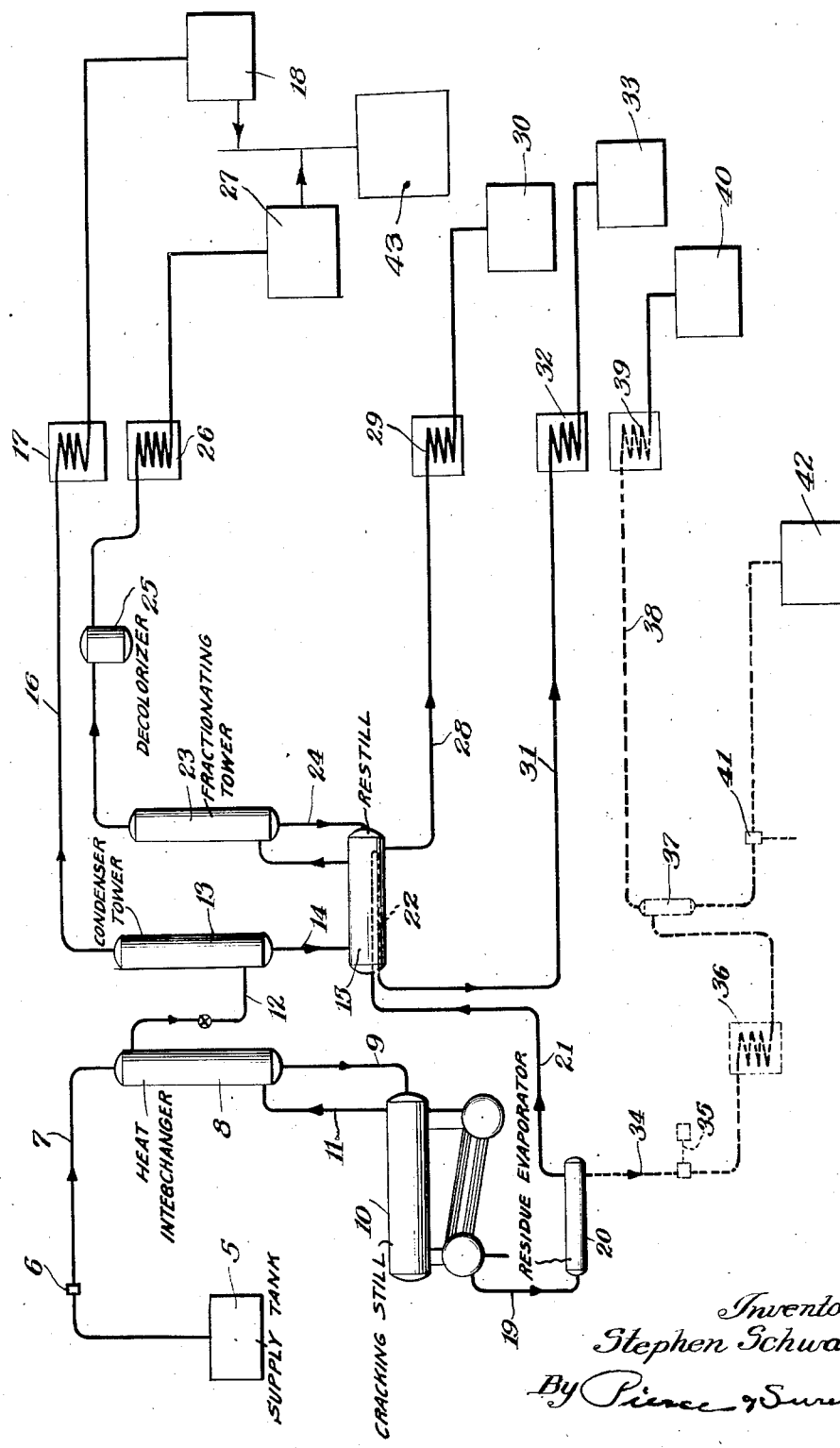
Figure 1 is a diagram outlining one embodiment of my invention.

The embodiment of my invention comprises a suitable supply tank 5 for the cracking stock which, for the purpose of illustration, may be fresh gas oil having a gravity of from 32° to 34° Bé. The oil is pumped from this tank by means of a pump 6 through the pipe line 7 and through the direct heat interchanger 8, through the pipe 9 into the still 10. The still disclosed herein is of the Jenkins type, but may be of any other desired type. The temperature and pressure in this still are maintained at the proper values to effect the cracking of the fuel being converted and, with the cracking stock indicated above would be in the neighborhood of 700° to 750° Fahrenheit, and a pressure of approximately 100 pounds to 140 pounds per square inch.

The vapors produced in the still 10 are withdrawn therefrom through the pipe 11 and pass through the heat interchanger 8 where they give up a portion of their heat to the uncracked oil passing to the still. In the particular case illustrated herein, this heat interchanger is operated to maintain a temperature of approximately 500° Fahrenheit in the vapor leaving the heat interchanger. This vapor passes through a suitably valved pipe 12 into the fractional condenser tower 13 where a certain portion of the vapors are condensed and pass through the pipe 14 into the still 15. If it is desired to produce a motor fuel having an end boiling point of, say, 437° Fahrenheit, the condenser tower 13 is operated so that the vapors passing therethrough will have an end boiling point of, say not above 410° Fahrenheit. The temperature of the vapor leaving this condenser tower will be approximately 270° Fahrenheit. These vapors pass through the pipe 16 to a suitable condenser 17, and the condensate is collected in a suitable tank 18.

The condensate from the condenser tower 13, that flows into the still 15, still contains a considerable percentage of constituents that can be used as a part of the motor fuel, but it is apt to contain uncracked constituents and coloring matter that would be objectionable in the final product. For removing this part of the condensate in the still 15, a certain amount of heat is required, and this heat is obtained in the following manner; as is usual in the operation of a Jenkins still, the liquid residue that is formed by the heavier constituents of the oil fed to the still is continuously withdrawn therefrom through the pipe 19, and passes into a pressure relief tank 20 where the pressure is released, or reduced. This reduction in the pressure permits the contained heat in the residue to vaporize a portion thereof, and under the conditions of operation referred to herein, this vapor will have a temperature of approximately 500° Fahrenheit. The vapor thus formed is conducted through the pipe 21 to the heating coil 22 in the still 15 where the greater portion of its heat is transferred to the condensate from the condenser tower 13, thereby causing the distillation of a certain percentage of the lighter fractions of this condensate, and these fractions pass to the condenser tower 23 where the heavier uncracked constituents are condensed and refluxed to the still 15 through the pipe 24. The uncondensed vapors may be, if desired, passed through any suitable means at 25 for removing the color therefrom and then through a suitable condenser 26 into a storage tank 27. The liquid residue from the still 15 can be continuously removed through the pipe 28 and the cooling coil 29 into the tank 30. The condensed and uncondensed vapors that pass through the heating coil 22 can be withdrawn through the pipe 31 and the condenser 32 into the tank 33. If desired, the liquid residue remaining in the pressure relief tank 20 can be withdrawn through the pipe 34 by means of the pump 35, and subjected to redistillation in a pipe still 36. The vapors from this still can be passed through a fractional condenser tower 37, from which the vapors can be withdrawn by the pipe 38, and passed through a condenser 39 into a tank 40. The liquid residue can be withdrawn from the fractional condenser tower 37 by means of a pump 41 and forced into a suitable reservoir 42. The condensates that are finally stored in tanks 18 and 27 are suitable for blending purposes for forming a motor fuel, which may be stored in the tank 43. The product recovered in the tank 30 makes a suitable stove oil, having a gravity in the neighborhood of 38° Bé. The product retained in the tanks 33 and 40 are gas oils, and tank 42 will contain the heavy residue resulting from the cracking process.

Figure 2:
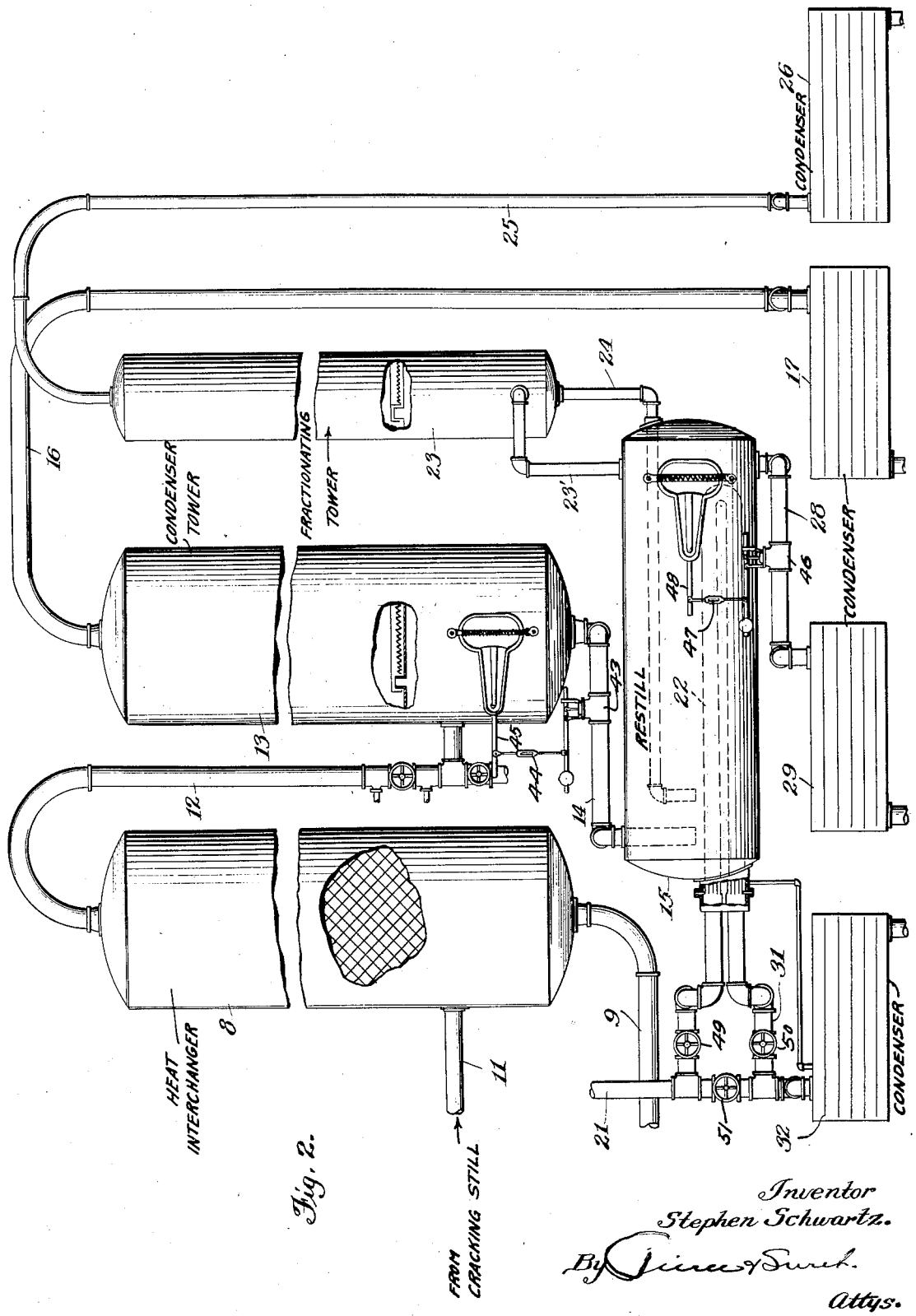
Figure 2 is a view on an enlarged scale, showing the details of construction of certain of the elements indicated in Figure 1.

Figure 2 shows somewhat more in detail the construction of the apparatus used, including the valve 43, operated by means of the link 44, lever 45 and a float (not shown) inside the tower 13. This float controlled mechanism maintains a constant level of condensate in the tower 13 and thus prevents any of the vapors entering this tower from passing into the still 15. I provide a similar valve 46, link 47, lever 48 and a float (not shown) in the still 15 for maintaining a substantially constant level of condensate in this still. In addition, valves 49, 50 and 51 are provided for properly controlling the flow of residuum vapors to and from the still 15 or for bypassing the residuum vapors directly to the condenser 32.

Having thus described my invention, what I claim is:

1. The method of producing petroleum distillates which comprises the feeding of a suitable cracking stock to a cracking still wherein a cracking temperature and pressure are maintained, withdrawing vapors from said still and subjecting said vapors to fractional condensation of such degree that the uncondensed vapors have a lower end boiling point than that of the distillate desired, withdrawing the condensate resulting from said fractional condensation and subjecting said condensate to fractional distillation, the heat for such fractional distillation being obtained by withdrawing the liquid residue from said cracking still, releasing the pressure on said residue, collecting the resulting heated vapors and passing said heated vapors in indirect heat interchange relationship with said condensate for the fractional distillation thereof.

2. Means for producing a motor fuel comprising a cracking still, means for effecting a partial condensation of the vapors from said cracking still and thus producing a condensate having a percentage of motor fuel therein, means for withdrawing the liquid residue from said cracking still and for releasing the pressure thereon to convert a portion of said residue into heated vapor, and means for passing said heated vapor in indirect heat interchange relationship with said condensate for the purpose of distilling an additional quantity of motor fuel from said condensate.

3. The method of producing petroleum distillates which comprises feeding stock to a cracking still, subjecting the vapors from said still to reflux condensation, subjecting the residual vapors from the reflux condensation to fractional condensation to separate an overhead portion having a lower end point than the product desired and a fractional condensate, subjecting the fractional condensate to partial volatilization to distill off an additional portion of the final product, reducing the pressure on the residue from the still, and utilizing the heat of the vapors thus generated to effect said partial volatilization of the fractional condensate.

4. The method of producing petroleum distillates which comprises subjecting a suitable stock to cracking conditions, condensing the heavier ingredients of the vapors from the stock in two stages at successively lower temperatures and pressures, the condensate from the first stage being returned to the still, and the condensate from the second stage being kept separate, stripping the condensate from the second stage of its lighter ingredients by heating to a higher temperature than that used in said second stage, relieving the pressure on the residue from the cracked stock, and utilizing the heat of the vapors from said residue to strip said second stage condensate.

5. The method of separating petroleum vapors having a predetermined end point from a mixture of vapors evolved from a cracking still which comprises condensing and separating from said mixture of vapors all fractions having an end point higher than that desired, including a relatively small proportion of lower end point vapors leaving only desired low end point vapors; withdrawing and vaporizing a portion of the liquid contents from said cracking still; and after said separation, revaporizing the lighter portion of said condensed vapors by indirect heat interchange with said vaporized withdrawn liquid contents; and fractionating out of said revaporized vapors that relatively small proportion of lower end point vapors desired.

6. The method of separating petroleum vapors having a predetermined end point from a mixture of vapors evolved from a cracking still which comprises separating selective fractions from said mixture of vapors leaving vapors having an end point higher than that desired; condensing and separating from said vapors all portions having an end point higher than that desired, including a relatively small proportion of lower end point vapors leaving only desired low end point vapors; withdrawing and vaporizing a portion of the liquid contents from said cracking still; and after said separation, revaporizing the lighter portions of said condensed vapors by indirect heat interchange with said vaporized withdrawn liquid contents; and fractionating out of said revaporized vapors that relatively small proportion of lower end point vapors desired.

7. A method of producing petroleum distillates which comprises heating hydrocarbon oils to a cracking temperature under pressure to evolve vapors therefrom, conducting a portion of said evolved vapors to a fractionating zone and therein separating out heavier fractions from said vapors as a condensate, withdrawing residual oils from the hydrocarbon oils subjected to a cracking temperature, reducing pressure on the oils so withdrawn while the latter are in a heated condition to effect a distillation of hot vapors therefrom; passing said hot vapors in indirect heat interchange with the aforesaid condensate of heavier fractions to effect a distillation of the lighter constituents thereof, and conducting off the lighter constituents so distilled.

8. A method of producing petroleum distillates which comprises feeding a suitable cracking stock to a cracking still wherein a cracking temperature and pressure are maintained, withdrawing vapors from said still and subjecting said vapors to fractional condensation, withdrawing the condensate resulting from said fractional condensation, and subjecting said condensate to fractional distillation, the heat for such fractional distillation being obtained by withdrawing the liquid residue from said cracking still, releasing the pressure on said residue, collecting the resulting heated vapors and passing said heated vapors in indirect heat interchange relationship with said condensate for the fractional distillation thereof.

9. A process of separating out vapors having a sharply defined end point from a mixture of vapors evolved from a mass of oils undergoing cracking which includes the steps of conducting said mixture of vapors to a separating zone and therein condensing out a heavy condensate fraction at a separation temperature considerably higher than the desired end point, conducting the remaining vapors to a fractionating zone and therein subjecting said vapors to fractional condensation at a separation temperature considerably lower than the desired end point thereby separating out as a condensate all fractions having an end point higher than that desired and also a relatively small proportion of desired low end points fractions leaving in vapor form only desired low end point vapors, conducting off said desired low end point vapors, retaining separate the condensate thus formed, withdrawing residiual oils from the hydrocarbon oils undergoing cracking, reducing pressure on the oils so withdrawn while the latter are in a heated condition to effect a distillation of hot vapors therefrom, passing said hot vapors in indirect heat interchange with the aforesaid condensate to redistill the same out of contact with other vapors, separately fractionating from the resulting vapors that relatively small proportion of desired low end point vapors contained therein, and conducting off said last-mentioned low end point vapors.

10. A method of producing petroleum distillates which comprises heating hydrocarbon oils to a cracking temperature under pressure to evolve vapors therefrom, conducting said evolved vapors to a separating zone and therein condensing out a heavy condensate fraction, returning said heavy condensate fraction to the aforesaid hydrocarbon oils heated to a cracking temperature, conducting the remaining vapors to a fractionating zone and therein separating out heavier fractions from said vapors as a condensate, withdrawing residual oils from the hydrocarbon oils subjected to a cracking temperature, reducing pressure on the oils so withdrawn while the latter are in a heated condition to effect a distillation of hot vapors therefrom, passing said hot vapors in indirect heat interchange with the aforesaid condensate of heavier fractions to effect a distillation of the lighter constituents thereof, and conducting off the lighter constituents so distilled.

In witness whereof, I hereunto subscribe my name this 5th day of December, 1925.

STEPHEN SCHWARTZ.